United States Patent [19]

Hasegawa et al.

[11] Patent Number: 4,637,269
[45] Date of Patent: Jan. 20, 1987

[54] DRIVE APPARATUS

[75] Inventors: Shigekazu Hasegawa; Tetsu Fukui, both of Sakai, Japan

[73] Assignee: Kubota, Ltd., Japan

[21] Appl. No.: 501,486

[22] Filed: Jun. 6, 1983

[30] Foreign Application Priority Data

| Jul. 16, 1982 [JP] | Japan | 57-108369[U] |
| Nov. 4, 1982 [JP] | Japan | 57-194400 |
| Nov. 5, 1982 [JP] | Japan | 57-195133 |

[51] Int. Cl.⁴ .............. F16H 3/02; F16H 3/08; F16H 3/38; B60K 20/10
[52] U.S. Cl. ..................... 74/335; 74/745; 74/360; 74/339
[58] Field of Search ........ 74/745, 740, 329, 331, 74/336 R, 336.5, 337, 339, 15.4, 665 GB, 360, 334, 335; 192/3.57

[56] References Cited

U.S. PATENT DOCUMENTS

| 2,732,727 | 1/1956 | Livermore | 74/336.5 X |
| 2,924,111 | 2/1960 | Backus et al. | 74/336.5 |
| 2,974,766 | 3/1961 | Perkins et al. | 74/339 X |
| 3,011,357 | 12/1961 | Binder | 74/334 |
| 3,039,320 | 6/1962 | Zens et al. | 74/339 X |
| 3,103,826 | 9/1963 | Jaeschke | 74/339 |
| 3,171,300 | 3/1965 | Perkins et al. | 74/745 |
| 3,248,962 | 5/1966 | McNemara | 74/339 |
| 3,422,939 | 1/1969 | Henry-Biabaud | 74/335 X |
| 3,537,335 | 11/1970 | Ezpeleta | 74/336.5 X |
| 3,808,903 | 5/1974 | Sauer | 74/335 |
| 3,941,007 | 3/1976 | Webber et al. | 192/3.57 X |
| 3,944,013 | 3/1976 | LaPointe | 74/335 X |
| 4,023,418 | 5/1977 | Zenker | 74/745 X |
| 4,452,101 | 6/1984 | Fujioka | 74/335 X |
| 4,459,872 | 7/1984 | Tibbles | 74/335 X |
| 4,476,748 | 10/1984 | Morscheck | 74/336.5 X |
| 4,498,356 | 2/1985 | Vater et al. | 74/335 X |

FOREIGN PATENT DOCUMENTS

| 0015141 | 1/1982 | Japan | 74/745 |
| 0124851 | 7/1983 | Japan | 74/745 |
| 48310 | 10/1983 | Japan | 74/335 |
| 48401 | 1/1984 | Japan | 74/335 |
| 2063395 | 6/1981 | United Kingdom | 74/745 |
| 2136895 | 9/1984 | United Kingdom | 74/335 |

Primary Examiner—Kenneth J. Dorner
Assistant Examiner—Stephen B. Andrews
Attorney, Agent, or Firm—Kane, Dalsimer, Kane, Sullivan and Kurucz

[57] ABSTRACT

A drive apparatus for a work vehicle such as a tractor is disclosed, with an engine, an input shaft coupled to the engine, a change-speed mechanism, a hydraulic clutch, an auxiliary change-speed mechanism and a reduction mechanism housed in a common transmission case. Power from the reduction mechanism is transmitted to the rear wheels through a rear differential and to the front wheels through a drive shaft and a front differential.

6 Claims, 6 Drawing Figures

DRIVE APPARATUS

BACKGROUND OF THE INVENTION (1) Field of the Invention

This invention relates to a drive apparatus comprising an engine, a main clutch and a power shift transmission.

(2) Description of the Prior Art

Referring to FIG. 6, a drive apparatus according to the prior art has a main clutch 2 interposed between an engine E and a power shift transmission 1. This construction has a problem of requiring a change speed power shift means 13 having a great shifting force, which results in the shift means 13 per se being large size, and the power shift transmission 1 and a hydraulic change speed mechanism therefore having to be large size too.

More particularly, in effecting a change speed operation with the prior art construction after the main clutch 2 and the shift means 13 are put out, one of freely rotatable driven gears Gb is rigidly connected by operating the shift means 13 to a driven shaft S2 rotating at a different speed by inertia to the driven gear Gb. At this time the shift means 13 has to be operated against mass inertia of all of an input shaft S1, a plurality of drive gears Ga fixedly mounted thereon, and the driven gear Gb in constant mesh with the drive gears Ga, respectively, and therefore the shift means 13 needs a great shifting force.

SUMMARY OF THE INVENTION

Having regard to the above state of the art, an object of this invention is to provide a rational and simple improvement utilizing the essential function of the power shift means thereby to make the shift means compact.

To achieve this object, the invention provides a drive transmission as set out in the introduction hereof and characterized by the main clutch being mounted downstream of the power shift transmission operatively connected to the engine.

To be particular, the invention is based on the fact that the power shift means is, by nature, operable even when maintaining power transmission from the engine to an input shaft of the power shift transmission, and provides a simple improvement consisting in disposition of the main clutch downstream of the power shift transmission. This construction permits a change speed operation to be carried out by putting in the shift means, after the main clutch and the shift means are put out, with a small force just enough to resist mass inertia of the driven shaft (or an output shaft of the power shift transmission upstream of the clutch) in order to rigidly connect one of the driven gears to the driven shaft rotating at a different speed thereto. The shift means of this invention is therefore far smaller than that of the prior art which is shifted against mass inertia of the input shaft and the plurality of gears. As a result, the hydraulic mechanism for actuating the shift means and the power shift transmission in its entirety also are made compact according to this invention.

Other objects and advantages of the invention will be apparent from the following description.

BRIEF DESCRIPTION OF THE DRAWINGS

The drawings show a drive apparatus according to this invention and a known drive apparatus, in which.

DESCRIPTION OF THE PREFERRED EMBODIMENTS

Figure 1:
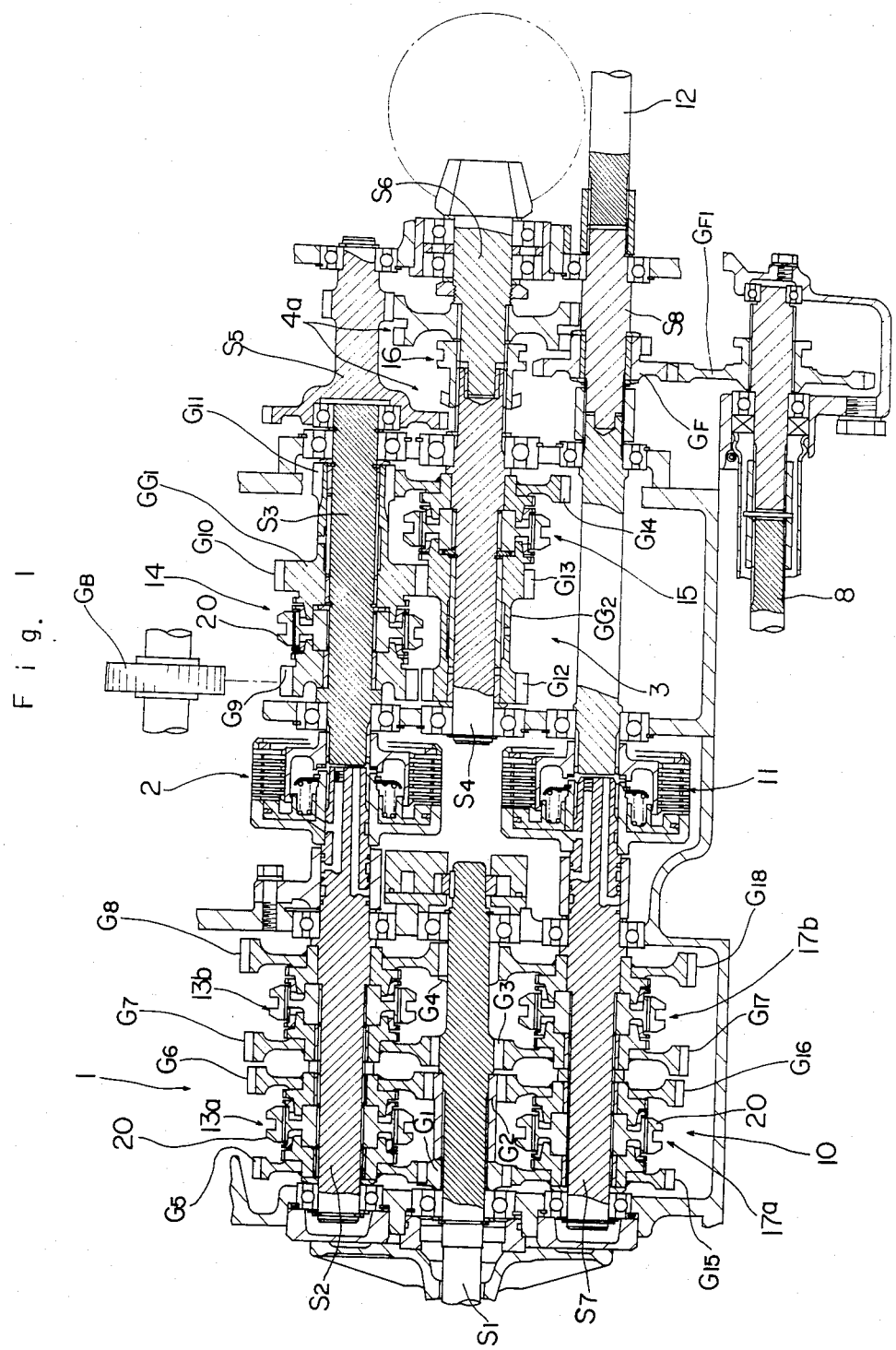
FIG. 1 is a sectional view of the drive apparatus according to this invention.
Figure 2:
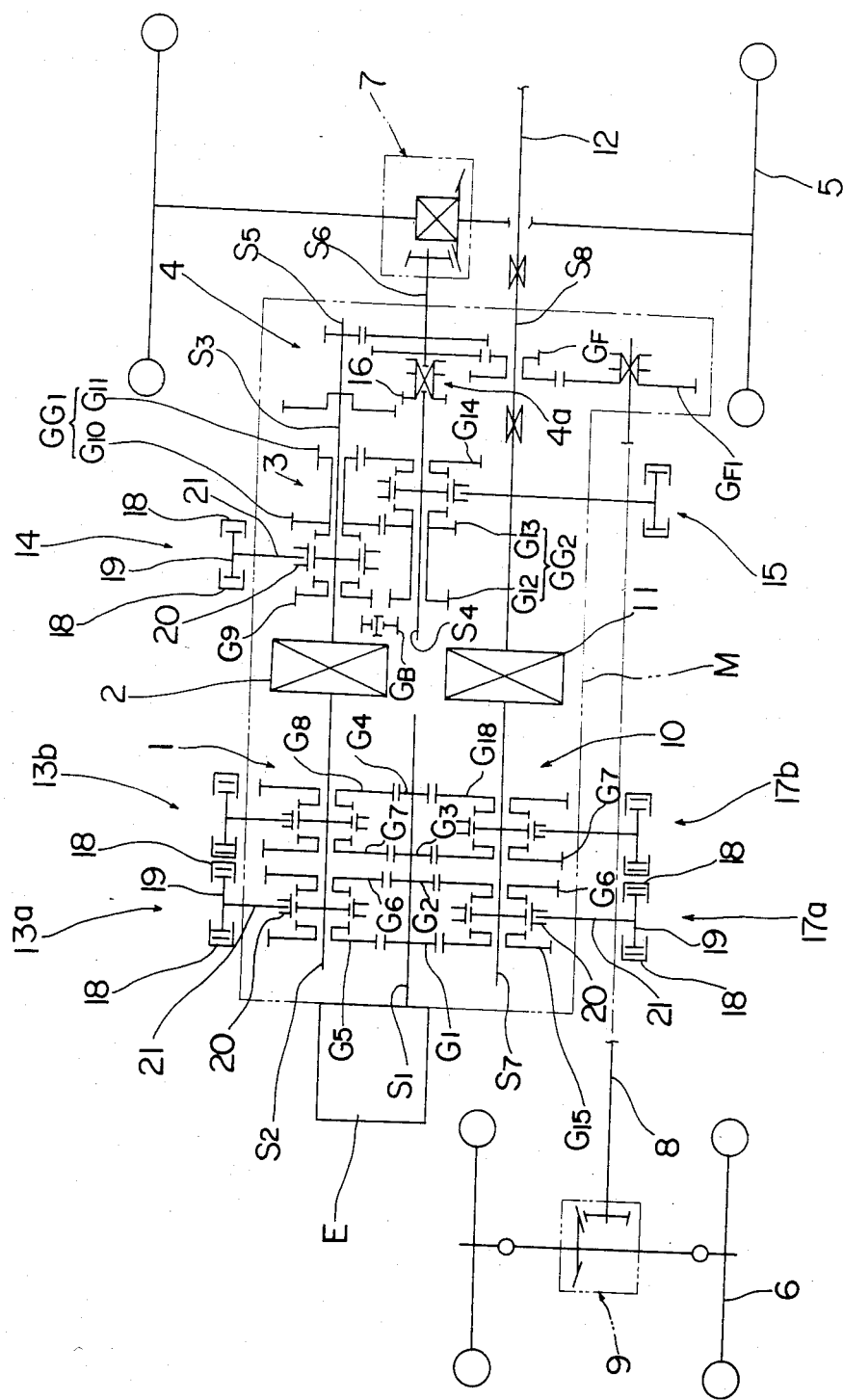
FIG. 2 is a schematic view of the drive apparatus.

Referring to FIGS. 1 and 2 showing a drive apparatus for a four wheel drive working vehicle such as a tractor, power of an engine E is transmitted to a main change speed mechanism 1, then a hydraulic clutch 2, an auxiliary change speed mechanism 3 and to a super reduction mechnaism 4, all housed in a transmission case N. From the super reduction mechanism 4 power is transmitted to rear wheels 5 through a rear differential 7 and to front wheels 6 through a drive shaft 8 and a front differential 9.

The transmission case M also houses a power takeoff change speed mechanism 10 which takes power from an upstream side of the main change speed mechanism 1 and passes it through a hydraulic multidisc clutch 11 on to a power takeoff shaft 12 for actuating an attached implement.

Each of the change speed mechanisms 1, 3, 4 and 10 is particularly described hereinafter.

The main change speed mechanism 1 comprises an input shaft S1 carrying four drive gears G1–G4 having varied numbers of teeth and rotatable together with the input shaft S1, and a driven shaft S2 of a traveling system carrying four driven gears G5–G8 to be freely rotatable thereon and in constant mesh with the drive gears G1–G4, respectively. Two synchromesh shift means 13a and 13b are provided between adjacent pairs of driven gears G5–G8, respectively, to selectively bring one of each pair of driven gears G5 or G6 and G7 or G8 into rigid connection with the driven shaft S2, thereby to provide four speeds.

The auxiliary change speed mechanism 3 comprises a third shaft S3 which receives power from the main change speed mechanism 1 through the clutch 2 and carries, for free rotation thereon, a ninth gear G9 in constant mesh with a backing relay gear GB and a first gear joint GG1 rigidly interconnecting two gears G10 and G11 having different numbers of teeth, and a fourth shaft S4 carrying, for free rotation thereon, a second gear joint GG2 rigidly interconnecting a gear G12 in constant mesh with the backing relay gear GB and a gear G13 in constant mesh with one of the gears G10 of the first gear joint GG1, and a gear G14 in constant mesh with the other gear G11 of the first gear joint GG1. Synchromesh shift means 14 and 15 are provided between the ninth gear G9 and the first gear joint GG1 and between the second gear joint GG2 and the fourteenth gear G14, respectively, to selectively bring the gears G9 and G14 and the gear joints GG1 and GG2 into rigid connection with the third shaft S3 is operable to switch between backward drive and forward drive, and the shift means 15 on the fourth shaft S4 is operable to switch between a high speed and a low speed.

The super reduction mechanism 4 comprises a fifth shaft S5, a final output shaft S6 coaxial with the fourth shaft S4, and a shift means 16. The shift means 16 is operable to switch between an ordinary change speed position in which the fourth shaft S4 is directly connected to the final output shaft S6 and a super reduction position in which power from the fourth shaft S4 is transmitted by a roundabout route, i.e. to the fifth shaft S5 via a super reduction gearing 4a and to the final output shaft S5.

The main change speed mechanism 1, the auxiliary change speed mechanism 3 and the super reduction mechanism 4 as described above provide, in combination, sixteen forward speeds and sixteen backward speeds. Power is transmitted from the final output shaft S6 to the front wheel drive shaft 8 via a relay gear GF freely rotatably mounted on a power takeoff output shaft S8. A gear GF1 is provided to mesh with the relay gear GF at a downstream side thereof, the gear GF1 being shiftable between a four wheel drive position and a two wheel drive position.

The power takeoff change speed mechanism 10, like the main change speed mechanism 1, comprises a driven shaft S9 of a power takeoff system carrying, for free rotation thereon, gears G15–G18 in constant mesh with the four drive gears G1–G4, respectively. Two synchromesh shift means 17a and 17b are provided between adjacent pairs of free rotation gears G15–G18, respectively, to selectively bring one of each pair of free rotation gears G15 or G16 and G17 or G18 into rigid connection with the power takeoff driven shaft S9, thereby to provide four speeds for the power takeoff system.

To shift each of the synchromesh shift means 13a, 13b, 14, 15, 17a and 17b, a common plunger 19 is provided slidably between a coaxially opposed pair of pilot cylinders 18, and each of the shafts S carries a shift element 20 to be rotatable with the shaft S and slidable thereon, the shift element 20 being engaged by a shift fork 21 connected to an intermediate position of the plunger 19. The plunger 19 is slidable by flowing pressure fluid in and out of the cylinder 18.

A hydraulic drive construction for the change speed mechanism 1, 3 and 10 is particularly described hereinafter with reference to FIGS. 2 and 3.

For actuating the main change speed mechnaism 1 and the auxiliary change speed mechanim 3, the respective pilot cylinders 18 of the two shift means 13a and 13b of the main change speed mechanism 1 and the high speed and low speed switching shift means 15 of the auxiliary change speed mechanism 3 are connected parallel to one another to pressure oil feed lines 22 extending from a pressure oil pump P through a travelling speed changing valve V1. The pilot cylinders 18 of the backward and forward switching shift means 14 of the auxiliary change speed mechanism 3 is connected, parallel to the above travelling speed changing system, to the oil feed lines 22 extending through a backward and forward switching valve V2.

The travelling speed changing valve V1 comprises a switch valve having nine positions N and F1–F8 including neutral position N, which is operable to provide eight speeds by a combination in eight ways of the three shift means 13a, 13b and 15 connected thereto. The backward and forward switching valve V2 is operable to switch the eight speeds between backward and forward directions.

The shift means 13a, 13b, 14 and 15 also constitute three-way switch valves $\sqrt{1}$–$\sqrt{4}$ receiving pressure oil from the valves V1 and V2 and utilizing the plungers 19 as slide spools. The three-way switch valve $\sqrt{1}$ is connected to a hydraulic operator section of the travelling system clutch 2 by an oil line 23 which includes a series of two-way switch valve $\sqrt{'}2$–$\sqrt{'}4$ operable by pilot pressures provided by the remaining three-way switch valves $\sqrt{2}$–$\sqrt{3}$, respectively. This construction permits the travelling system clutch 2 to be "in" only when both the backward and forward switching shift means 14 and the high speed and low speed switching shift means 15 are out of their neutral position and one of the two shift means 13a and 13b of the main change speed mechanism 1 is out of its neutral position. In operating the travelling speed switching valve V1 or the backward and forward switching valve V2 from one change speed position to another, the travelling system clutch 2 automatically goes out when whichever shift element 20 moves from an operative position to neutral, and automatically comes in when whichever shift element 20 moves from neutral to an operative position.

For actuating the power takeoff change speed mechanism 10, the pilot cylinders 18 of the two shift means 17a and 17b are connected parallel to each other to the pump P through a power takeoff speed changing valve V3. The power takeoff speed changing valve V3 comprises a five-way switch valve having five positions n, f1–f4 including a neutral position n, and operable to provide four power takeoff speeds by a combination in four ways of the two shift means 17a and 17b.

The shift means 17a and 17b constitute two three-way switch valves $\sqrt{5}$ and $\sqrt{6}$ utilizing the plungers 19 as slide spools. Two-way switch valves $\sqrt{'}5$ and $\sqrt{'}6$ operable by pilot pressures from the three way valves $\sqrt{5}$ and $\sqrt{6}$, respectively, are mounted in series on an oil line 24 connecting the pump P to a hydraulic operator section of the power takeoff clutch 11. The power takeoff clutch 11 automatically goes out only when the two shift means 17a and 17b both move to neutral by operating the power takeoff speed changing valve V3. In other words, the shift means 17a and 17b are shiftable to the "in" position with a small force just enough to resist mass inertia of the power takeoff driven shaft S7 which is out of operative connection with the attached implement, whereby each of the shift means 17a and 17b and the hydraulic construction therefor may be small.

Each of the change speed mechanisms 1, 3, 4 and 10 may be modified in varied ways in the number of speeds it provides, in the arrangement of gears and so forth. The shift means 13a and 13b of the synchromesh type too may be replaced by known power shift means of varied types.

With the use of different type shift means 13a, 13b, the change speed mechanism 1 and clutch 2 may also be modified by employing a hydraulic or electric construction.

The drive apparatus according to this invention is applicable to varied working vehicle such as for use in agriculture or construction. In accordance with the type of vehicle, the auxiliary change speed mechanism, the super reduction mechanism, or the power take off change speed mechanism, for example, may be disposed with as desired or may be arranged in a different order of power transmission to the described order. In short, the most salient feature of the invention lies in that the main clutch 2 is mounted downstream of the power shift transmission represented by the main change speed mechanism 1.

Figure 4:
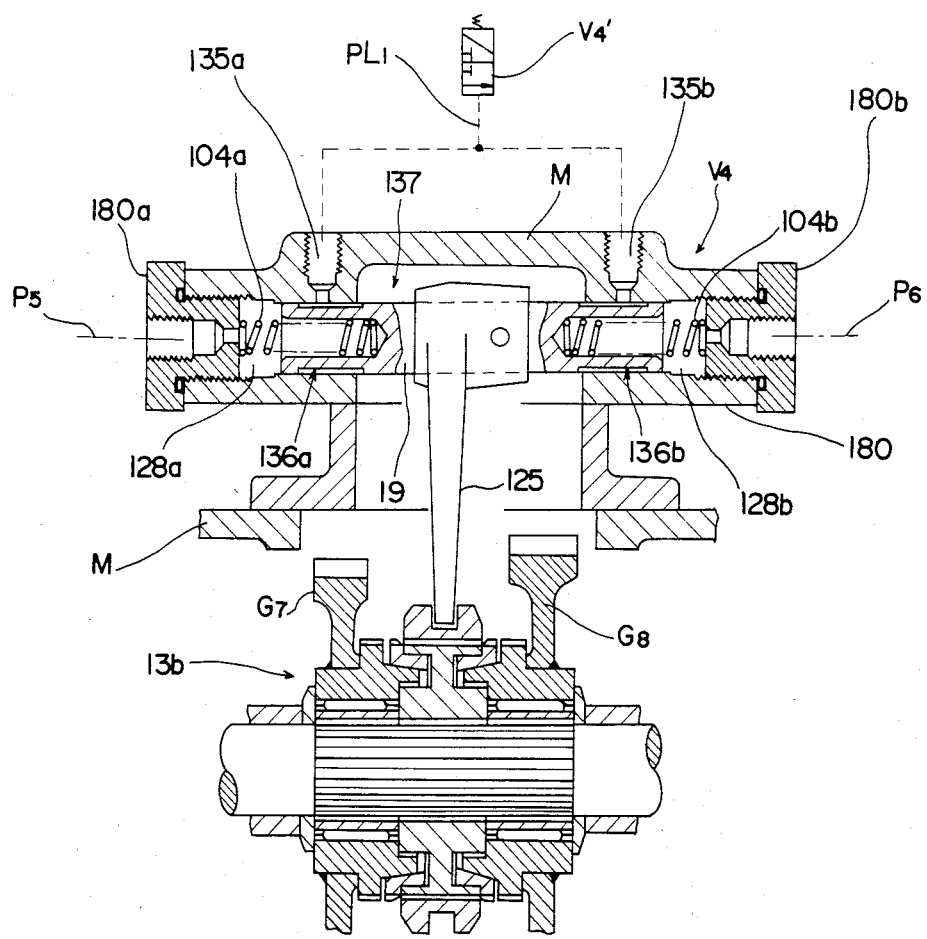
FIG. 4 is an enlaged view in vertical section of a principal part of the drive apparatus showing a relationship between a cahnge speed means and a hydraulic clutch in neutral position.
Figure 5:
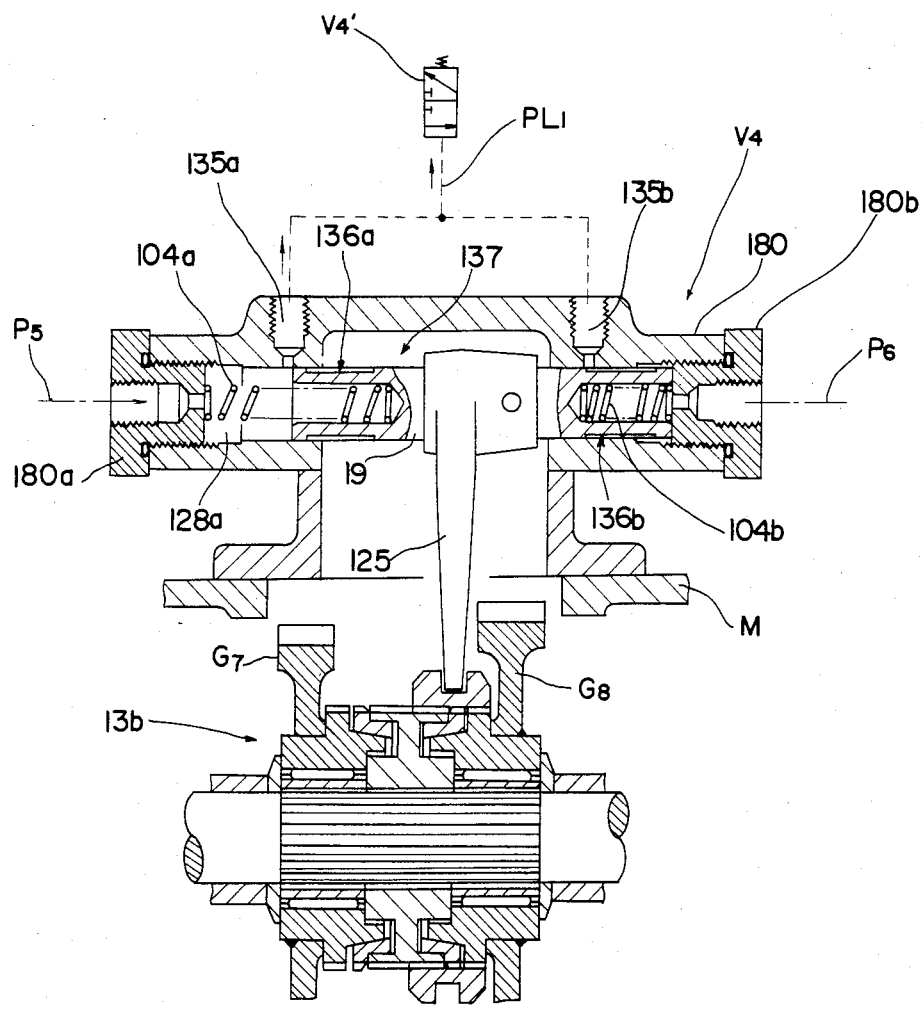
FIG. 5 is a view similar to FIG. 4 and showing the change speed means in one speed position.
Figure 6:
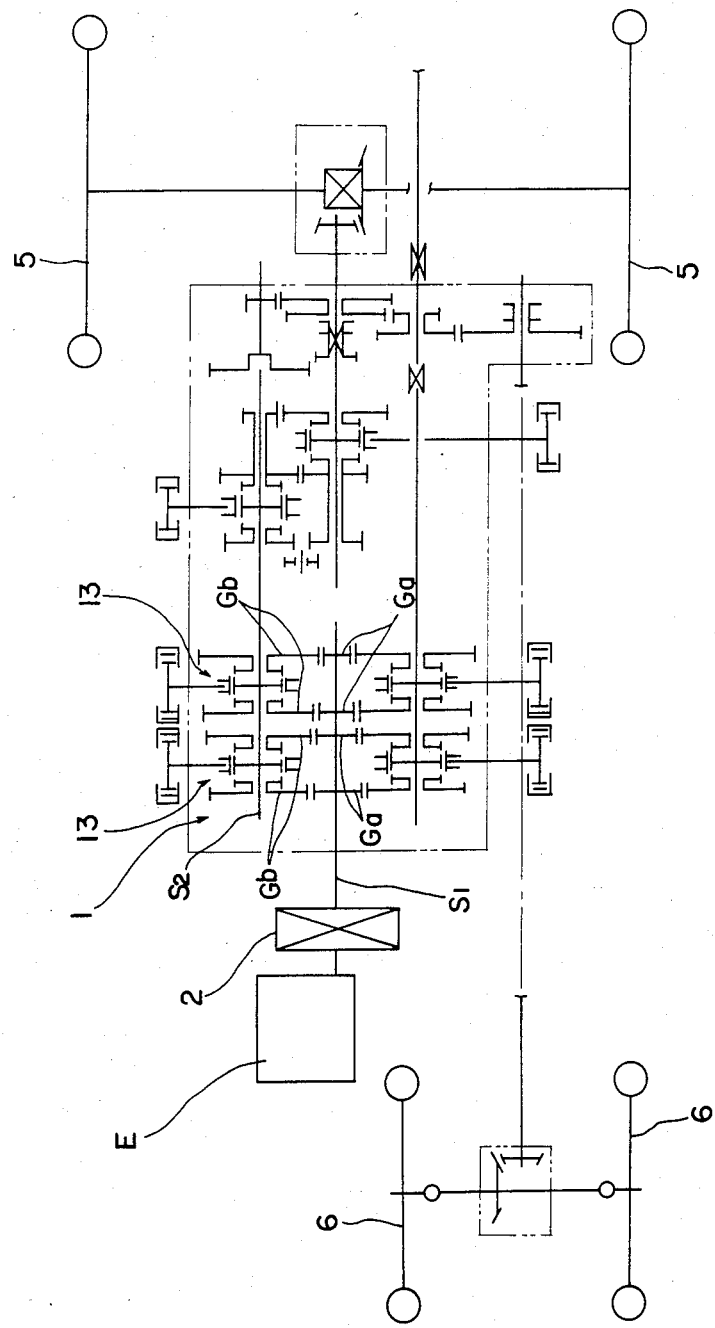
FIG. 6 is a schematic view of a prior art construction.

Referring to FIGS. 4 and 5, the high speed and low speed switching shift means 13b of the main change speed mechanism 1 and the valve V4 are constructed as follows. The plunger 19 of the shift means 13b acts also as a slide spool of the valve V4. The plunger 19 is slidably mounted in the pilot cylinders 18 provided in a portion of the transmission case M. A shift fork 125 is rigidly connected to a mid-point axially of the plunger 19. The plunger 19 includes axial bores at respective ends thereof to house springs 104a and 104b. Each of the springs 104a and 104b has one end supported at a bottom of the bore and the other end supported by a plug 180a or 180b of the cylinder 18, whereby the plunger 19 is constantly urged to place the shift fork 125 in neutral. The plunger 19 defines annular grooves 136a and 136b having a relatively large width in its axial direction adjacent the respective ends thereof. The pilot cylinders 18 include output ports 135a and 135b which are constantly in communication with the annular grooves, respectively, regardless of the sliding movements of the plunger 19. The ports 135a and 135b conjoin into a pilot line PL1 leading to the valve V4'. Number 128a and 128b denote cylinder chambers, and numbers P5 and P6 denote oil lines connected to the travelling speed changing valve V1.

When the pressure oil is suppied to the oil lines P5 and P6 of the valve V4, the two ports 135a and 135b are in communication with a drain space 137 defined centrally of the transmission case M through the annular grooves 136a and 136b, respectively as shown in FIG. 4.

When the valve V1 is switched to supply pressure oil to the oil line P5, the plunger 19 of the valve V2 moves to a righthand end as shown in FIG. 5. In this position one of the ports 135a is in communication with the cylinder chamber 128a and the other port 135b is shut within the transmission case M, whereby oil pressure of the oil line P5 is applied to the pilot oil line PL1. This pilot pressure opens the valve V4', and oil pressure acting on the valve V4' through the other valve V2' is applied to the oil line for the main clutch 2 to put in the main clutch 2.

When the valve V1 is operated to switch from one speed position, with the main clutch 2 put in, to another speed position, the supply of pressure oil to the oil line P5 stops and the plunger 19 returns toward neutral (i.e. leftward in the drawings) by the force of the spring 104b. As the plunger 19 moves slightly and the righthand end of the plunger 19 departs from a deep end face of the cylinder 128b, bringing the port 135b into communication with the cylinder chamber 128b and the oil line P6 through the annular groove 136b, the pressure in the pilot oil line PL1 begins to lower. As the plunger 19 makes a further slight movement, the lefthand end of the annular groove 136a begins to interfere with the port 135a, bringing the pilot oil line PL1 into communication with the drain space 137 through the port 135a and the annular groove 136a. The resulting release of the pilot pressure causes the valve V4' to make a return movement thereby allowing the pressure in the oil line for the main clutch 2 to escape and putting out the main clutch 2 immediately.

To obtain one speed by supplying pressure oil to the oil line P6 of the valve V4, pilot pressure is applied to the pilot oil line PL1 through the other port 135b, putting in the main clutch 2. When switching from this speed position, the pilot pressure is released also through the annular grooves 136a and 136b a in the above case.

Figure 3:
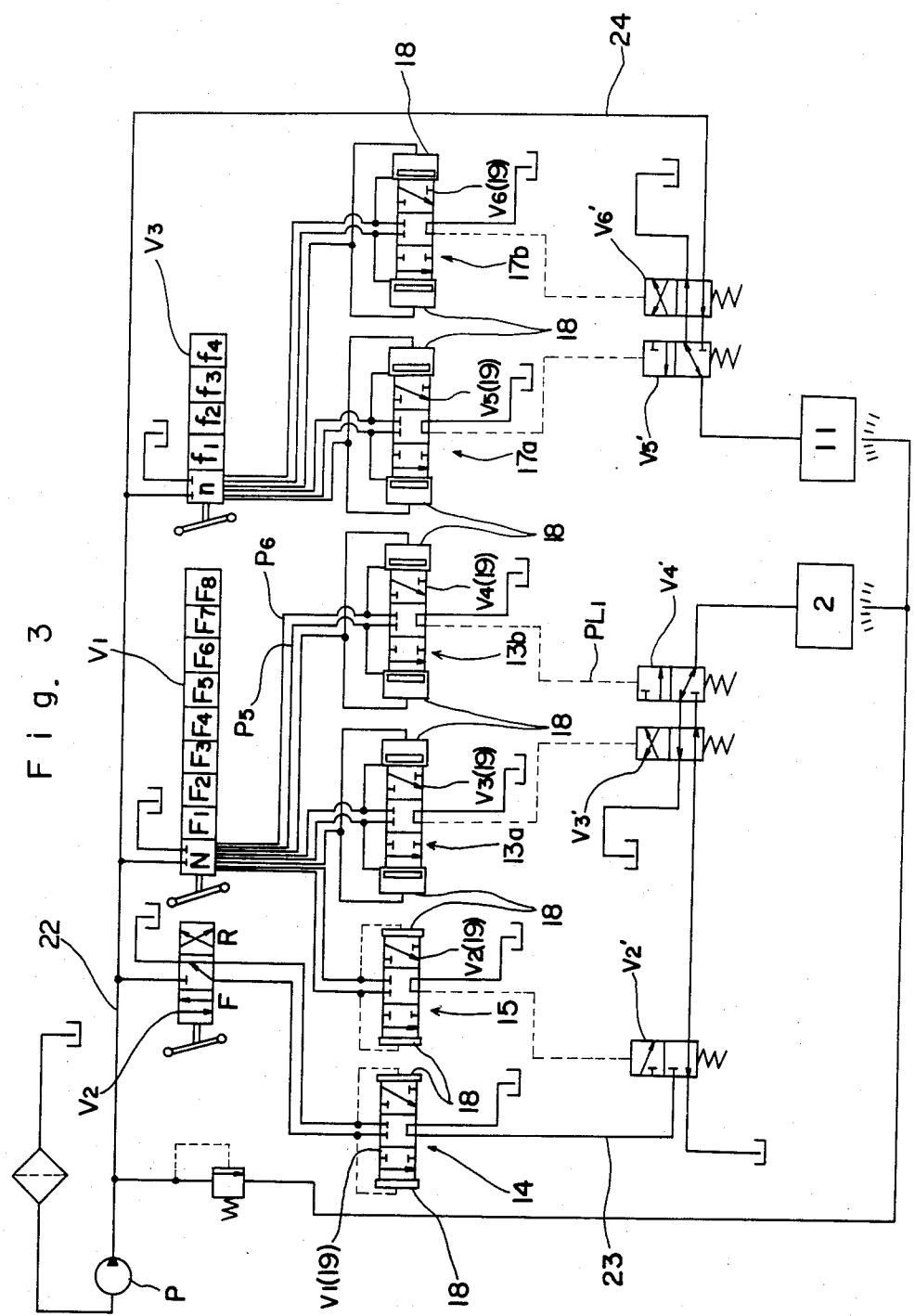
FIG. 3 is a schematic view of a hydraulic drive circuitry.

The described interlocking construction between the shift means 13b and the valve V4 is used also for the other shift means and the valves corresponding thereto, as shown in FIG. 3.

The described construction in which the piston rod of the pilot valve which acts also as hydraulic change speed means is provided with the wide annular grooves for releasing the pilot pressure, the pressure release action starting with a slight departure of the piston rod from one speed position at a stroke end thereby to put the hydraulic clutch, is effective to put out the hydraulic clutch at a position intermediate between change speed positions promptly and reliably, thereby maintaining a good synchronous relationship between a gearchanging operation and a clutch operation, and assuring a smooth change speed operation.

We claim:

1. A drive apparatus comprising:
   an input shaft operatively connected to an engine;
   an output shaft operatively connected to travelling means;
   a transmission line operatively interconnected between said input and output shafts, said line including first and second intermediate shafts;
   clutch means disposed between said first and second intermediate shafts for operatively interconnecting and disconnecting said first and second intermediate shafts;
   change speed means including at least one change speed shift means for effecting speed changes between said input shaft and said first intermediate shaft, said shift means including synchro shift means and a first hydraulic switch valve moveable between neutral, first and second change speed positions, said change speed means further including a shift selector for selective operation of said first switch valve;
   said clutch means being responsive to the neutral position of the shift means for effecting the operative disconnection, and responsive to the change speed positions of the shift means for effecting the operative interconnection of the first and second intermediate shafts;
   a source of pressurized fluid, said shift selector and clutch means being hydraulically connected in parallel to said source of pressurized fluid; and
   a first pilot fluid operated switch valve hydraulically connected between said fluid source and clutch means;
   said first hydraulic switch valve being (a) operative in the first and second change speed positions to supply pilot fluid to the first pilot fluid operated switch valve for causing said first pilot switch valve to switch to a selected position for providing communication of the clutch means with the source of pressurized fluid, and (b) operative in the neutral position to block the pilot fluid to the first pilot fluid operated switch valve for causing said first pilot switch valve to switch to another selected position for preventing communication of the clutch means with the source of pressurized fluid.

2. The drive apparatus of claim 1 further comprising forward-reverse switching means and auxiliary change speed means connected in series between the second intermediate shaft and the output shaft and including hydraulically operable forward-reverse switching shift means and auxiliary change speed shift means, respectively, said auxiliary change speed shift means including synchro shift means and a second hydraulic switch valve moveable between neutral, first and second change speed positions, said shift selector for permitting selective operation of said second switch valve.

3. The drive apparatus of claim 2 further comprising a second pilot fluid operated switch valve hydraulically connected in series with said first pilot fluid operated switch valve between said fluid source and clutch means;

said second hydraulic switch valve being (a) operative in the first and second change speed positions to supply pilot fluid to the second pilot operated switch valve for causing said pilot second switch valve to switch to a selected position for providing communication of the clutch means with the fluid source, and (b) operative in the neutral position to block the pilot fluid to the second pilot fluid operated switch valve for causing said second switch valve pilot to switch to another selected position for preventing communication of the clutch means with the fluid source.

4. The drive apparatus of claim 3 wherein said forward-reverse switching shift means includes synchro shift means and a third hydraulic switch valve moveable between neutral, forward and reverse positions.

5. The drive apparatus of claim 4 wherein said third hydraulic switch valve is hydraulically connected in series with said first and second pilot fluid operated switch valves between said fluid source and clutch means, said third hydraulic switch valve being (a) operable in the forward and reverse positions to provide communication of the clutch means with the fluid source, and (b) operative in the neutral position to prevent communication of the clutch means with the fluid source.

6. The drive apparatus of claim 5 wherein said third hydraulic switch valve includes:
a plunger provided with a shift fork for the synchro shift means and being hydraulically operated by said shift selector;
a transmission case defining cylinder chambers therein, said cylinder chambers supporting respective ends of said plunger;
pilot ports defined in said transmission case and hydraulically connected to the pilot fluid operated switch valve;
pilot pressure releasing annular grooves defined in said plunger peripherally and adjacent the respective ends thereof;
said grooves being brought into and out of communication with said ports by shifting movements of said plunger, said annular grooves having a large width axially of said plunger to establish communication between one of the cylinder chambers and one of the ports to which the oil has been supplied to shift said plunger and close the other port when said plunger is at a stroke end, and to establish communication between said ports and a drain space provided outwardly of the cylinder chambers through said annular grooves when said plunger departs from said stroke end.

* * * * *